United States Patent
Goenka

(10) Patent No.: US 12,556,467 B2
(45) Date of Patent: Feb. 17, 2026

(54) RPD EVENT STORM MITIGATION

(71) Applicant: ARRIS Enterprises LLC, Suwanee, GA (US)

(72) Inventor: Anand Kumar Goenka, Bengaluru (IN)

(73) Assignee: ARRIS Enterprises LLC, Horsham, PA (US)

( * ) Notice: Subject to any disclaimer, the term of this patent is extended or adjusted under 35 U.S.C. 154(b) by 536 days.

(21) Appl. No.: 18/072,609

(22) Filed: Nov. 30, 2022

(65) Prior Publication Data

US 2023/0171170 A1    Jun. 1, 2023

Related U.S. Application Data

(60) Provisional application No. 63/284,943, filed on Dec. 1, 2021.

(51) Int. Cl.
| | | |
|---|---|---|
| *H04L 43/065* | (2022.01) | |
| *H04L 41/069* | (2022.01) | |
| *H04L 12/28* | (2006.01) | |

(52) U.S. Cl.
CPC .......... *H04L 43/065* (2013.01); *H04L 41/069* (2013.01); *H04L 12/2801* (2013.01)

(58) Field of Classification Search
CPC . H04L 43/065; H04L 41/069; H04L 12/2801; H04L 41/0622; H04L 41/0681; H04L 41/0894; H04L 12/2876; H04L 43/106; H04L 43/16

See application file for complete search history.

(56) References Cited

U.S. PATENT DOCUMENTS

| | | | | |
|---|---|---|---|---|
| 8,081,659 | B2 * | 12/2011 | Sowinski | H04L 12/2861 725/111 |
| 2016/0014008 | A1 * | 1/2016 | Metts | H04L 43/16 370/252 |
| 2017/0366983 | A1 * | 12/2017 | Gunasekara | H04L 43/0811 |
| 2019/0386808 | A1 * | 12/2019 | Finkelstein | H04L 5/14 |
| 2019/0386926 | A1 * | 12/2019 | Abedini | H04W 56/0065 |
| 2020/0127732 | A1 * | 4/2020 | Krapp | H04B 10/038 |
| 2021/0021503 | A1 * | 1/2021 | Kfir | H04L 43/065 |
| 2022/0060347 | A1 * | 2/2022 | Sevindik | H04N 7/17309 |
| 2022/0070049 | A1 * | 3/2022 | Keller | H04L 41/065 |
| 2022/0239572 | A1 * | 7/2022 | Tao | H04L 41/0631 |
| 2024/0080221 | A1 * | 3/2024 | Smith | H04L 12/2861 |
| 2024/0305533 | A1 * | 9/2024 | Bai | H04W 24/02 |

* cited by examiner

*Primary Examiner* — Schquita D Goodwin
(74) *Attorney, Agent, or Firm* — Chernoff, Vilhauer, McClung & Stenzel, LLP

(57) ABSTRACT

An access network can include a plurality of remote nodes connected to a principal controller. The principal controller can experience an event storm when one or more of the plurality of remote nodes report an access network event at the same or substantially the same time. One or more remote nodes can mitigate such an event storm at the principal core by delaying by an event reporting delay the reporting of the access network event to the principal core. The event reporting delay can be based on an event delay policy associated with a given remote node. The even reporting delay can be different for each remote node or a group of remote nodes so that the principal core does not receive reports from the plurality of remote nodes so as to cause an event storm which can negatively impact the access network, one or more network devices, or both.

20 Claims, 7 Drawing Sheets

RPD EVENT STORM MITIGATION

BACKGROUND

Many networks include legacy systems that require an interface between legacy coaxial cable networks to optical networks. An optical node module receives data via optical fibers at one or more downstream ports, converts that data to radio frequency (RF) signals, and delivers those RF signals to legacy coaxial networks at one or more RF ports. The Data Over Cable Interface Specification (DOCSIS) is one standard among many that supports Distributed Access Architectures (DAA) that utilize modular systems having nodes that bridge between fiber optic cables that propagate optical signals at a northbound interface, and coaxial cables that propagate signals at a southbound interface to service downstream customers having e.g., cable modems, set top boxes, etc. One way to achieve the modularity above is to separate the DOCSIS media access control (MAC) functionality from the DOCSIS physical layer (PHY) functionality into two different systems. In a DOCSIS network, a Converged Cable Access Platform (CCAP) may be divided into a CCAP core situated in the head-end and a remote node. A DAA architecture can also include multiple CCAP cores, such as a principal core and at least one auxiliary core.

Typically in a CCAP architecture, the principal core can handle only so many events from remote devices at a node. When an event associated with an auxiliary core occurs, that event may trigger a report by any one or more connected remoted devices. Generally, when an auxiliary device fails or connectivity is interrupted, each remote node connected to that auxiliary core detects and reports the event to the principal core, since each remote node does not know whether any other remote node also reported the event. Each remote node detects the event at approximately the same time, and thus the principal core can receive multiple reports of the same event at substantially the same time. If enough reports are received within a narrow time frame, the principal core can experience an "event storm" that overloads or burdens the principal core due to the processing of multiple events at about the same time from the different remote nodes. Such an event storm can cause network traffic delays, loss of data, for example, dropping of messages between the remote nodes and principal core, lost time synchronization, disruption/delay of time-sensitive traffic, any other network traffic failures, or any combination thereof. Thus, there is a need for mitigation of an event storm at a principal controller, such as a principal core, due to an event such as an event at an auxiliary core, so as to not impede the performance of the principal controller.

SUMMARY

According to aspects of the present disclosure, an improved event reporting to a principal controller in an access network is provided. A network architecture such as an access architecture for cable networking can experience failures that cause the generation of an event report. For example, a network, also referred to as an access network, can be a centralized access architecture (CAA) or a distributed access architecture (DAA) that includes a converged cable access platform (CCAP) core. Historically, a principal controller, such as the CCAP core would manage event reporting across all of the remote nodes within the network architecture. However, today, a principal controller can be connected to multiple distributed remote nodes, for example, and the CCAP core can be distributed as a principal core along with one or more auxiliary cores spread throughout the network architecture. When an event occurs at a remote node or a device connected to the remote node, such as occurs during a loss of connection at the auxiliary core, each remote node connected to the auxiliary core typically reports the event to the principal controller, causing an event storm. These "event storms" may also be caused by the simultaneous occurrence of multiple different events. Regardless, because the remote nodes are generally unaware that any other remote node is reporting an event, the substantially simultaneous reporting of events to the principal controller by each remote node can disrupt, or otherwise adversely affect the performance of the access network and in particular the principal controller.

Disclosed are devices, systems, and methods that prevent event storms by implementing a delay in event reporting at one or more of the remote nodes, where the amount of the delay varies over the remote nodes. A remote node is configured with an event delay policy. This event delay policy provides for an event-reporting delay amount such that the remote node delays by the associated amount the reporting of the event to a principal controller. In this way, the principal controller does not simultaneously, or substantially simultaneously, receive multiple reports of an event and thus the principal controller can continue to process other network events, requests, traffic, any other network requirements, or any combination thereof while also handling the event associated with the remote node, e.g., the failure of the auxiliary core. By implementing an event delay policy at one or more of the remote nodes in an access network, the performance of the principal controller is improved, and network resources are conserved.

An aspect of the present disclosure is drawn to a method for a remote node, of a plurality of remote nodes, connected to a principal controller of an access network to mitigate an event storm at the principal controller. The method comprises detecting an access network event associated with the access network, generating a report based on the access network event, initiating an event reporting delay based on an event delay policy associated with the remote node, and sending the report to the principal controller of the access network after the event reporting delay so as to mitigate the event storm.

In an aspect of the present disclosure, the method is such that the remote node comprises a remote physical layer (PHY) device (RPD), a remote PHY media access control (MACPHY) device (RMD), or both, and wherein the principal controller is a principal core, and wherein the access network event is associated with an auxiliary core connected to the remote node or a precision time protocol (PTP) synchronization.

In an aspect of the present disclosure, the method is such that the remote node is a remote media access control physical layer (MACPHY) device (RMD), a remote media access control core (RMC) device, or both, and wherein the access network event is associated with a registration or de-registration of a cable modem connected to the RMD, the RMC device, or both.

In an aspect of the present disclosure, the method is such that the principal controller is a principal core, and wherein the access network event is associated with a loss of connection between the remote node and an auxiliary core of the access network.

In an aspect of the present disclosure, the method further comprising storing the report in an event pending queue prior to sending the report to the principal controller.

In an aspect of the present disclosure, the method further comprising associating a timestamp with the report, and storing the report and the timestamp in a local log of the remote node, wherein the timestamp indicates a time of occurrence of the access network event.

In an aspect of the present disclosure, the method is such that the delay policy comprises a delay factor, wherein the delay factor is based on any of a random number generator, a type of access network event, a threshold associated with a number of occurrences of the type of access network event, an event storage capacity of the remote node, any combination thereof.

An aspect of the present disclosure is drawn to a remote node of a plurality of remote nodes, connected to a principal controller of an access network to mitigate an event storm at the principal controller. The remote node comprises a memory storing one or more computer-readable instructions, and a processor connected to the memory. The processor is configured to execute the one or more computer-readable instructions to detect an access network event associated with the access network, generate a report based on the access network event, initiate an event reporting delay based on an event delay policy associated with the remote node, and send the report to the principal controller of the access network after the event reporting delay so as to mitigate the event storm.

In an aspect of the present disclosure, the remote node comprises a remote physical layer (PHY) device (RPD), a remote PHY media access control (MACPHY) device (RMD), or both, and wherein the principal controller is a principal core, and wherein the access network event is associated with an auxiliary core connected to the remote node or a precision time protocol (PTP) synchronization.

In an aspect of the present disclosure, the remote node is a remote media access control physical layer (MACPHY) device (RMD), a remote media access control core (RMC) device, or both, and wherein the access network event is associated with a registration or de-registration of a cable modem connected to the RMD, the RMC device, or both.

In an aspect of the present disclosure, the principal controller is a principal core, and wherein the access network event is associated with a loss of connection between the remote node and an auxiliary core of the access network.

In an aspect of the present disclosure, the processor is further configured to execute the one or more computer-readable instructions to store the report in an event pending queue prior to sending the report to the principal controller.

In an aspect of the present disclosure, the initiating the delay comprises associating a timestamp with the report and storing the report and the timestamp in a local log, wherein the timestamp indicates a time of occurrence of the access network event.

In an aspect of the present disclosure, the delay policy comprises a delay factor, wherein the delay factor is based on any of a random number generator, a type of access network event, a threshold associated with a number of occurrences of the type of access network event, an event storage capacity of the remote node, any combination thereof.

An aspect of the present disclosure provides a computer readable medium of a remote node having one or more computer-readable instructions stored thereon. The one or more computer-readable instructions when executed by a processor of the remote node, cause the remote node to perform one or more operations including the steps of the methods described herein.

BRIEF DESCRIPTION OF THE DRAWINGS

Like reference numbers and designations in the various drawings indicate like elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples and not for the purpose of limiting the present disclosure as defined by the appended claims and their equivalents. The words and phrases used in the following description and claims are merely used to enable a clear and consistent understanding of the present disclosure. In addition, descriptions of well-known structures, functions, and configurations may be omitted for clarity and conciseness. Those of ordinary skill in the art will recognize that various changes and modifications of the examples described herein can be made without departing from the spirit and scope of the present disclosure.

Generally, there is no control on the number of events that can be generated at the same time by any of a plurality of remote nodes in an access network that are connected to a principal controller. The reporting of an event at the same time by various remote nodes can trigger an event storm, causing a burden on the principal controller that is receiving the events and can lead to degradation in the performance and quality of an access network. The present disclosure describes improved devices, systems, and methods for reporting events by the plurality of nodes in an access network so as to mitigate one or more effects of such an event storm.

Figure 1:
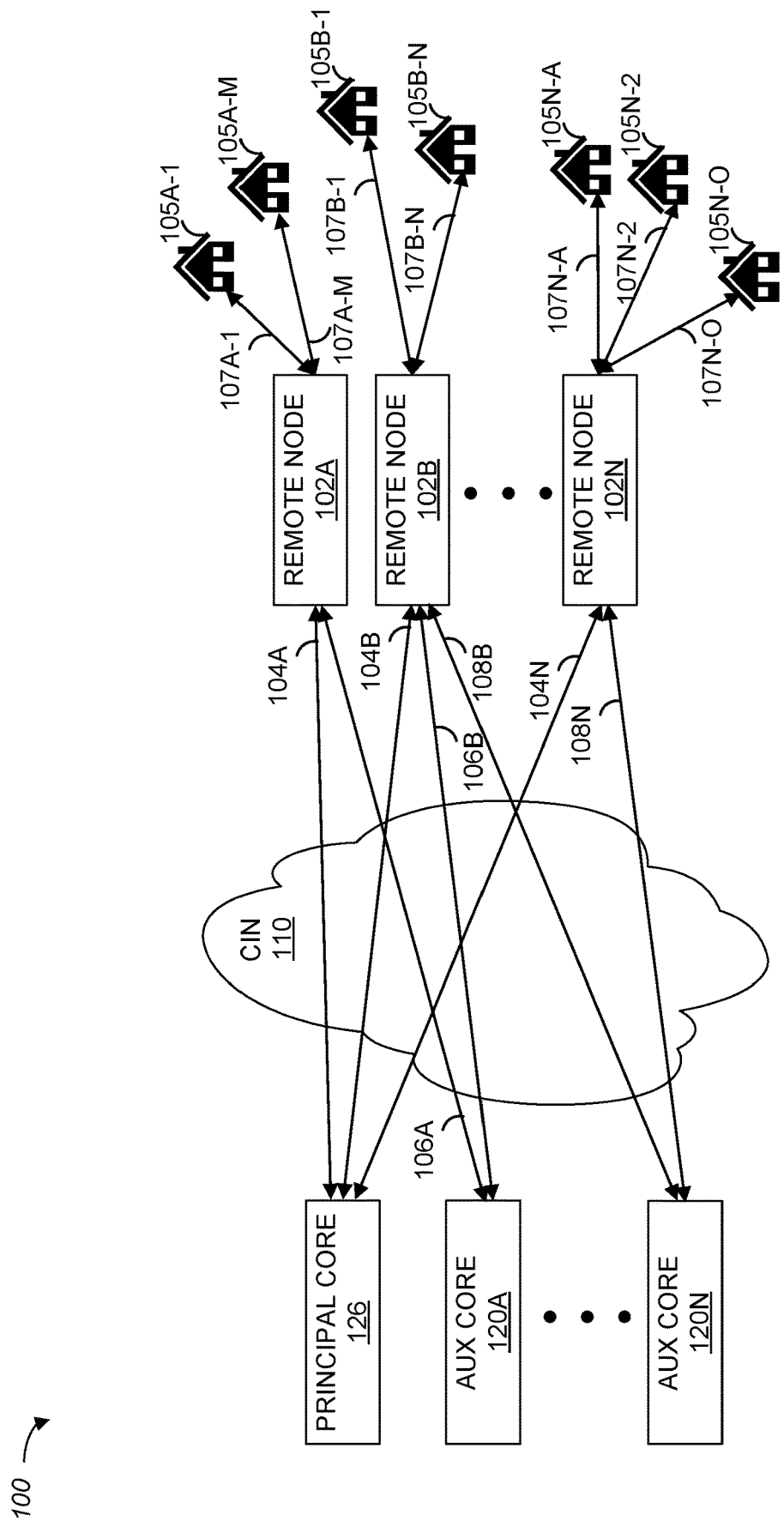
FIG. 1 is a diagram of an access network environment, according to one or more aspects of the present disclosure.

FIG. 1 is a diagram of an access network environment 100, according to one or more aspects of the present disclosure. The access network environment 100 comprises one or more network devices so as to form an access network, such as any of one or more client devices 105 (for example, one or more client devices 105A-1, 105A-M, 105B-1, 105B-N, 105N-1, 105N-2, and 105N-O, collectively referred to as one or more client devices 105, where M, N, and O represent any number of client devices 105), a plurality of remote nodes 102 (for example, remote nodes 102A, 102B and 102N, collectively referred to as remote nodes 102, where N represents any number of remote nodes 102), a converged integrated network (CIN) 110, a principal controller, such as a principal core 126, one or more auxiliary (AUX) cores 120 (for example, one or more auxiliary cores 120A and 120N, collectively referred to as auxiliary core 120, where N represents any number of auxiliary cores 120). One or more remote nodes 102 can comprise any of a remote physical layer (PHY) device (RPD), a remote media access control PHY (MACPHY) device (RMD), a remote MAC core (RMC) device, any other type of remote node, or any combination thereof. While FIG. 1 illustrates various network devices, the present disclosure contemplates any number of network devices within the access network environment 100.

In one or more embodiments, a client device 105 can be any type of a network device that connects to a remote node 102, for example, a hand-held computing device, a personal computer (such as desktop and laptop), an electronic tablet, a mobile phone, a smart phone, a smart speaker, an Internet-of-Things (IoT) device (such as smart assistant, iControl devices, portable music players with smart capabilities capable of connecting to the Internet, cellular networks, and interconnecting with other devices via Wi-Fi and Bluetooth (BT), any other wireless electronic device, or any combination thereof. A client device 105 can be connected to a remote node 102 via a connection 107, for example, client devices 105A-1, 105A-M, 105B-1, 105B-N, 105N-1, 105N-2, and 105N-O can connect to the remote node 102A via connections 107A-1, 107A-M, 107B-1, 107B-N, 107N-1, 107N-2, and 107N-0, respectively.

Each remote node 102 serving any one or more client devices 105 can connect directly or indirectly to a principal controller, such as a principal core 126, and one or more auxiliary cores 120, such as any of auxiliary cores 120A and 120N, collectively referred to as auxiliary core 120, where N represents any number of auxiliary cores, via CIN 110. For example, remote nodes 102A, 102B, and 102N can connect via connections 104A, 104B, and 104N, respectively, to principal core 126, remote nodes 102A and 102B can connect via connections 106A and 106B, respectively, to auxiliary core 120A, and remote nodes 102B and 102N can connect via connections 108B and 108N, respectively, to auxiliary core 120N. While FIG. 1 illustrates only remote nodes 102A-N connected to respective auxiliary cores 120A-N, the present disclosure contemplates any number of remote nodes 102 connected to any number of auxiliary cores 120.

Figure 2:
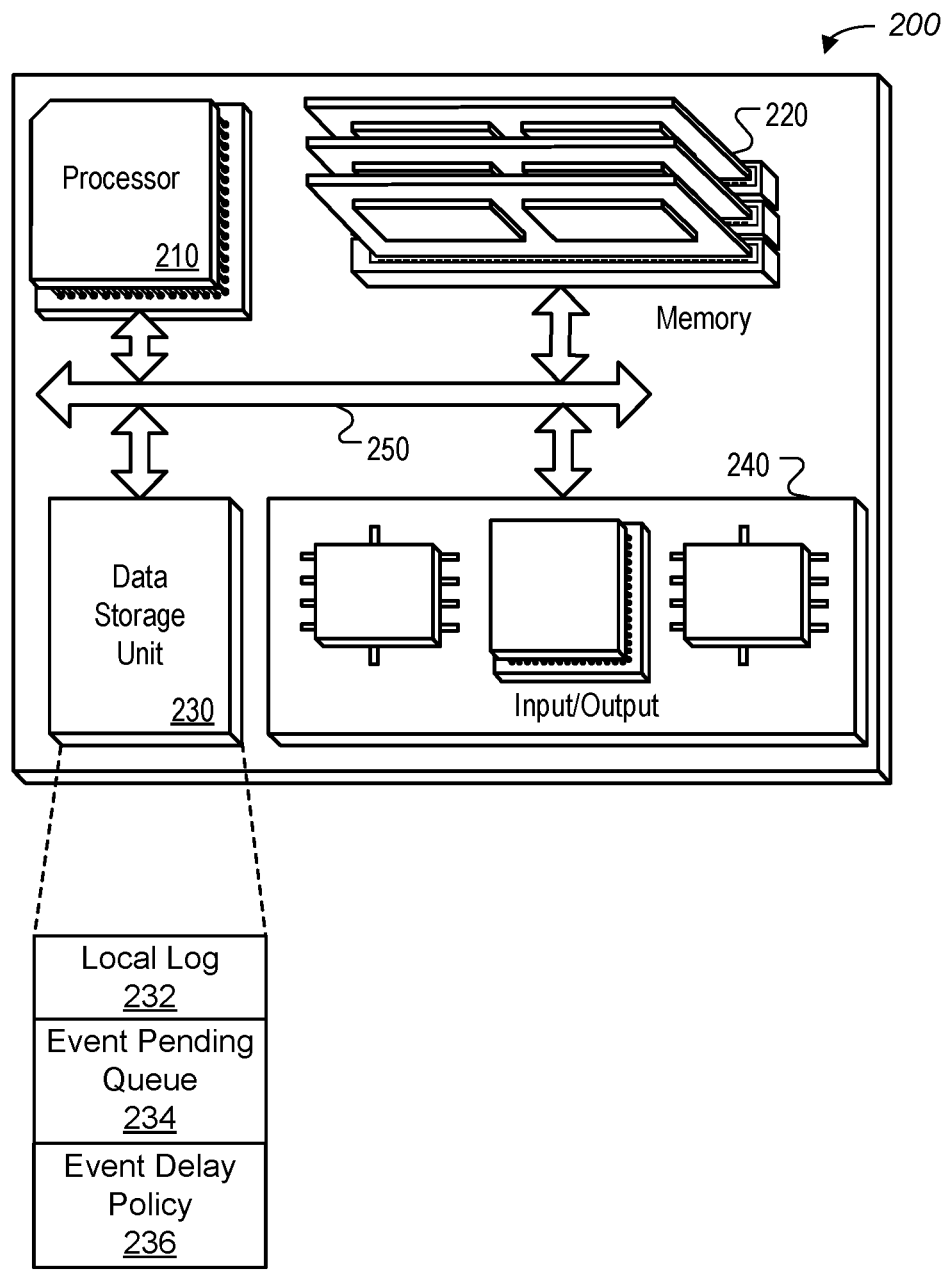
FIG. 2 is a block diagram of a hardware configuration for one or more devices, according to one or more aspects of the present disclosure.

FIG. 2 is a block diagram of a hardware configuration 200 for one or more network devices within an access network environment 100, for example, any of a client device 105, a remote node 102, a principal core 126, an auxiliary core 120, any other network device, or any combination thereof. The hardware configuration 200 can comprise a processor 210, a memory 220, a storage device or data storage unit 230, and an input/output (I/O) device 240. Each of the components 210, 220, 230, and 240 can, for example, be interconnected using a system bus 250. The processor 210 can be capable of processing one or more computer-readable instructions for execution within the hardware configuration 200. In one or more embodiments, the processor 210 can be a single-threaded processor. In one or more embodiments, the processor 210 can be a multi-threaded processor. The processor 210 can be capable of processing one or more computer-readable instructions stored in the memory 220 and/or on the storage device 230.

The memory 220 can store information within the hardware configuration 200. In one implementation, the memory 220 can be a computer-readable medium. In one implementation, the memory 220 can be a volatile memory unit. In another implementation, the memory 220 can be a non-volatile memory unit. In one or more embodiments, the storage device 230 can be capable of providing mass storage for the hardware configuration 200. In one implementation, the storage device 230 can be a computer-readable medium. In various different implementations, the storage device 230 can, for example, include a hard disk device, an optical disk device, flash memory or some other large capacity storage device. In other implementations, the storage device 230 can be a device external to the hardware configuration 200. In one or more embodiments, the storage device 230 can comprise any of a local log 232, an event pending queue 234, an event delay policy 236, or any combination thereof. The local log 232 can comprise one or more reports generated by a remote node based on an access network event. The event pending queue 234 can comprise a report that has yet to be sent to a principal controller. The event delay policy 236 can comprise one or more parameters for a delay associated with a remote, for example, as discussed with reference to FIG. 6. While FIG. 2 illustrates the local log 232, the event pending queue 234, and the event delay policy 236 stored in storage device 230, the present disclosure contemplates that any of the local log 232, the event pending queue 234, and the event delay policy 236 stored in storage device 230 can be stored in the memory 220, a network resource, any other storage device or medium, or any combination thereof.

The I/O device 240 provides I/O operations for the hardware configuration 200. In one implementation, the I/O device 240 can include one or more of a network interface device (for example, an Ethernet card), a serial communication device (for example, an RS-232 port), one or more universal serial bus (USB) interfaces (for example, a USB 2.0 port), one or more wireless interface devices (for example, an 802.11 card) for outputting video, voice, and/or data services to a client device 105 of FIG. 1 (for example, television, STB, computer, mobile device, tablet, telephone, wearable, etc.). As an example, the I/O device 240 can include one or more driver devices configured to send communications to, and receive communications from one or more networks and/or one or more network devices, such as a remote node 102.

Figure 3:
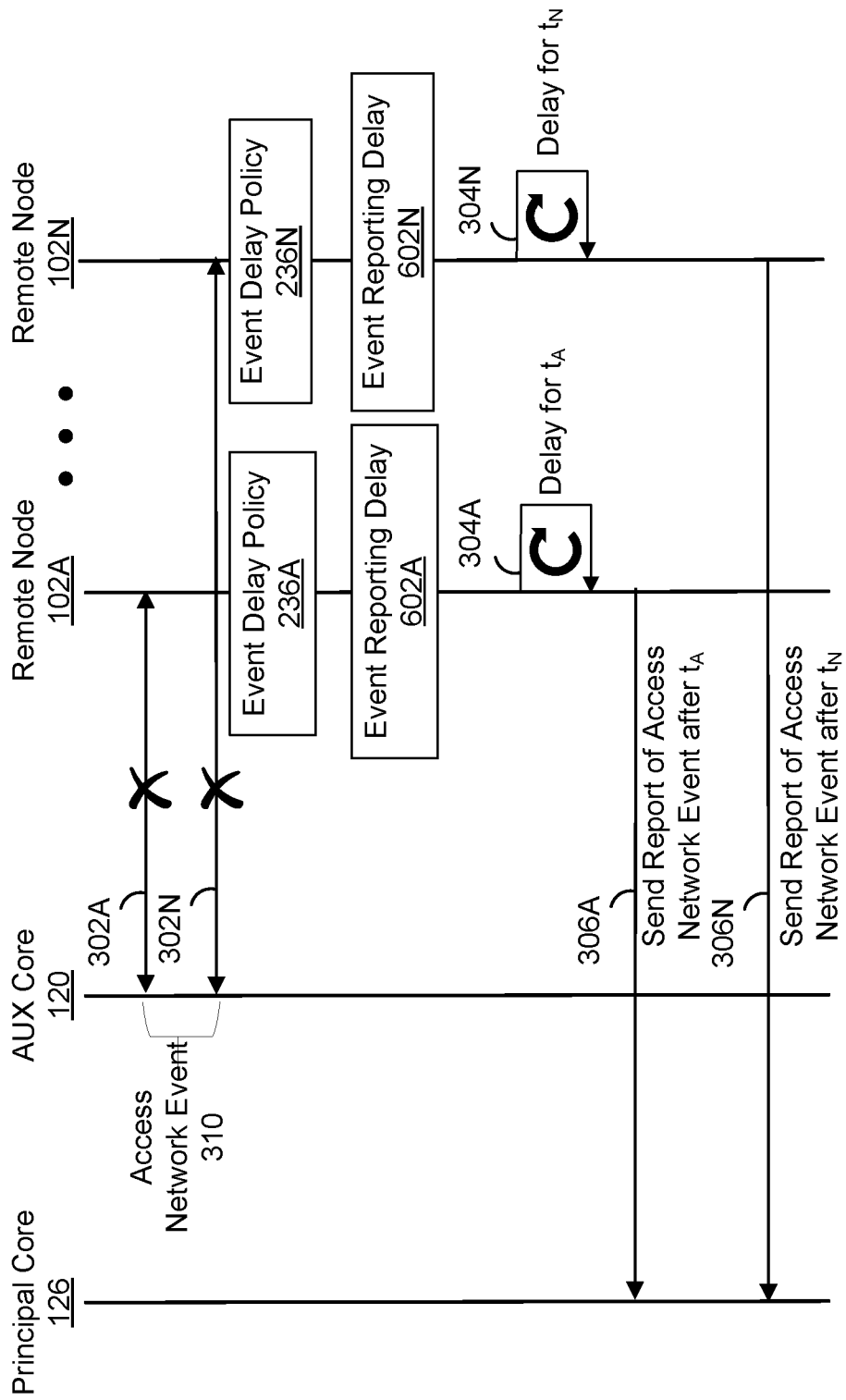
FIG. 3 is a flow diagram for a remote node to mitigate an event storm at a principal core of an access network, according to one or more aspects of the present disclosure.

FIG. 3 is a flow diagram for one or more remote nodes 102 to mitigate an event storm at a principal core 126 of an access network 300, according to one or more aspects of the present disclosure. The access network 300 can be the same as or similar to the access network environment 100 of FIG. 1. In one or more embodiments, the access network 300 can comprise a DOCSIS network management system. A plurality of remote nodes 102 (remote node 102A through remote node 102N, where N represents any number of remote nodes) are connected to a principal core 126 and one or more auxiliary cores (AUX) 120. The present disclosure contemplates that remote nodes 102A and 102N can represent one or more remote nodes 102 (such as a group of remote nodes or a set of remote nodes) associated with a first event delay policy 236A, a first event reporting delay 602A, or both and a second event delay policy 236N, a second event reporting delay 602N, or both, respectively.

In one or more embodiments, a remote node 102 can be an RPD that comprises a Telemetry server. During the course of operation, auxiliary core 120 can experience an access network event that disconnects the auxiliary core 120 from the access network environment such that one or more remote nodes 102 connected to the auxiliary core 120 lose connection to the auxiliary core 120. Such an access network event can comprise any type of failure of the auxiliary core 120, a failure and/or a reset of the associated precision time protocol (PTP) grandmaster, a Telemetry event generated from a Telemetry server on the RPD, such as any of a loss of power, an electrical, physical, or other interference, a loss of connection, any other event that can cause an event storm, or any combination thereof. For example, an access network event can be associated with a remote node 102, such as an RPD, losing PTP synchronization (such as, going into holdover) due to a failure of the PTP grandmaster, the RPD regaining PTP synchronization (such as going back to phase lock) due to a the PTP grandmaster coming up again, or both. In one or more embodiments, an access network event can comprise any type of event associated with a network, such as the access network 300, one or more network devices, or both that can cause generation of a plurality of reports to a principal controller such that the principal controller experiences an event storm if the plurality of reports are received at or about the same time.

As illustrated in FIG. 3, the auxiliary core 120 experiences a failure such that the auxiliary core 120 loses any one or more of the connections or communications 302A and 302N between any one or more of remote node 102A and remote node 102N, respectively. This loss of connection causes an access network event 300 at one or more of the remote nodes 102. For example, one or more remote nodes 102 can be an RPD that generates a generic control plane (GCP) event based on the access network event, such as the loss of connection 302 to an auxiliary core 120.

Figure 6:
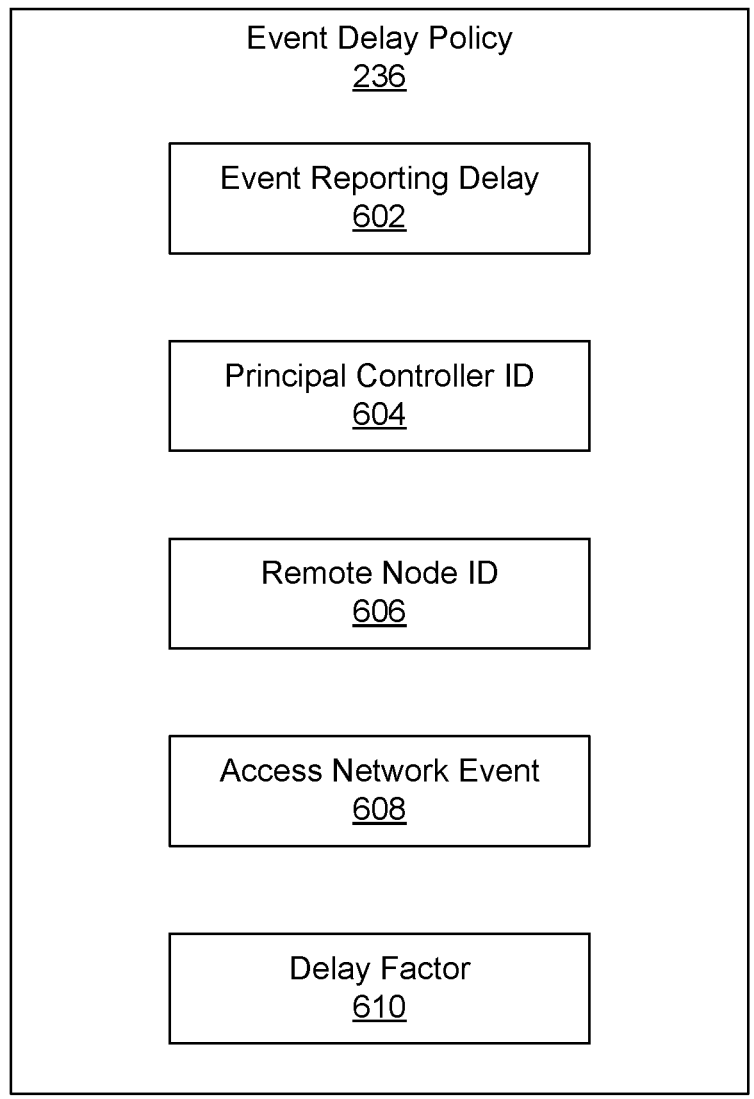
FIG. 6 is an exemplary event delay policy, according to one or more aspects of the present disclosure.

In response to the access network event 300, each of the remote nodes 102 can determine at 304 a respective delay so that the remote nodes 102 do not send a generated event to the principal core 126 at the same or substantially the same time. For example, as illustrated in FIG. 6, an event delay policy 236 can be configured for any of an access network, for example, access network environment 100 of FIG. 1, access network 300 of FIG. 3, any other access network, or any combination thereof. Each remote node 102 can be configured with a corresponding event delay policy 236. The event delay policy 236 can comprise any of an event reporting delay 602 that indicates a delay of time t for sending a generated event, a principal controller identifier (ID) 604, for example, that corresponds to an identifier for a principal core 126, remote node ID 606 that corresponds to an identifier for a remote node 102, and an access network event 608, any one or more other event delay policy parameters, any one or more network device identifiers, for example, an identifier associated with an auxiliary core 120, or any combination thereof. The event delay policy 236 can comprises one or more event reporting delays 602 associated with any of a principal controller ID 604, a remote node ID 606, an access network event 608, or any combination thereof.

The remote node 102A can determine an event reporting delay 602A of time to based on an associated event delay policy 236A and remote node 102N can determine an event reporting delay 602N of time $t_N$ based on an associated event delay policy 236N. For example, an event delay policy 236 can be associated with one or more access network events 608 such that the remote node compares the access network event 300 to one or more access network events 608 to determine the event delay policy 236 associated with the access network event 300 or that no event delay policy 236 is associated with the access network event 300. The event reporting delays 602A and 602N can be any increment of time, such as any of a time range, a time interval, a time threshold, any other time indicator or time delay, or any combination thereof. In one or more embodiments a first one or more remote nodes 102A can be associated with a first event reporting delay 602 while a second one or more remote nodes 102N can be associated with a second event reporting delay 602, and so on. For example, the remote node 102A can delay 304A for a time $t_A$ and remote node 102N can delay 304N for a time $t_N$, where $t_A$ and $t_N$ are not the same or denote different increments of time. The remote node 102 can store any one or more reports and/or access network events, such as a report 306, in a local log. The report 306 can be stored in the local log along with an associated timestamp indicating the exact or approximate occurrence time of the access network event. Any one or more reports 306 that have not yet been sent to the principal controller can also be stored in an event pending queue. The event reporting delay 602 can be such that storing of any one or more reports prior to sending to the principal controller does not exceed the storage capacity of the event pending queue. The local log, the event pending queue, or both can be stored in any of a memory 220, a data storage unit 230, any other memory, or any combination thereof.

The remote node 102A sends a report 306A to the principal core 126 after the associated event reporting delay 602A of $t_A$ and remote node 102N sends a report 306N to the principal core 126 after the associated event report delay 602N of $t_N$. The reports 306A and 306N can comprise the access network event and any other information associated with the access network event. In one or more embodiments, the report comprises a GCP event. While FIG. 3 illustrates only a remote node 102A and a remote node 102N, the present disclosure contemplates any number of remote nodes 102. The event reporting delay associated with each remote node 102 can vary by any increment of time so as to ensure that the principal core 126 does not receive above a threshold number of reports of the same access network event at the same time or substantially the same time, for example, based on a delay factor as discussed with reference to FIG. 6. In this way, any one or more remote nodes 102 or groups of one or more remote nodes 102 can have different event reporting delays 602 so as to mitigate an event storm as the one or more remote nodes 102 have an event report delay 602 that causes the one or more remote nodes 102 to stagger sending associated reports of an access network event to the principal core 126.

Figure 4:
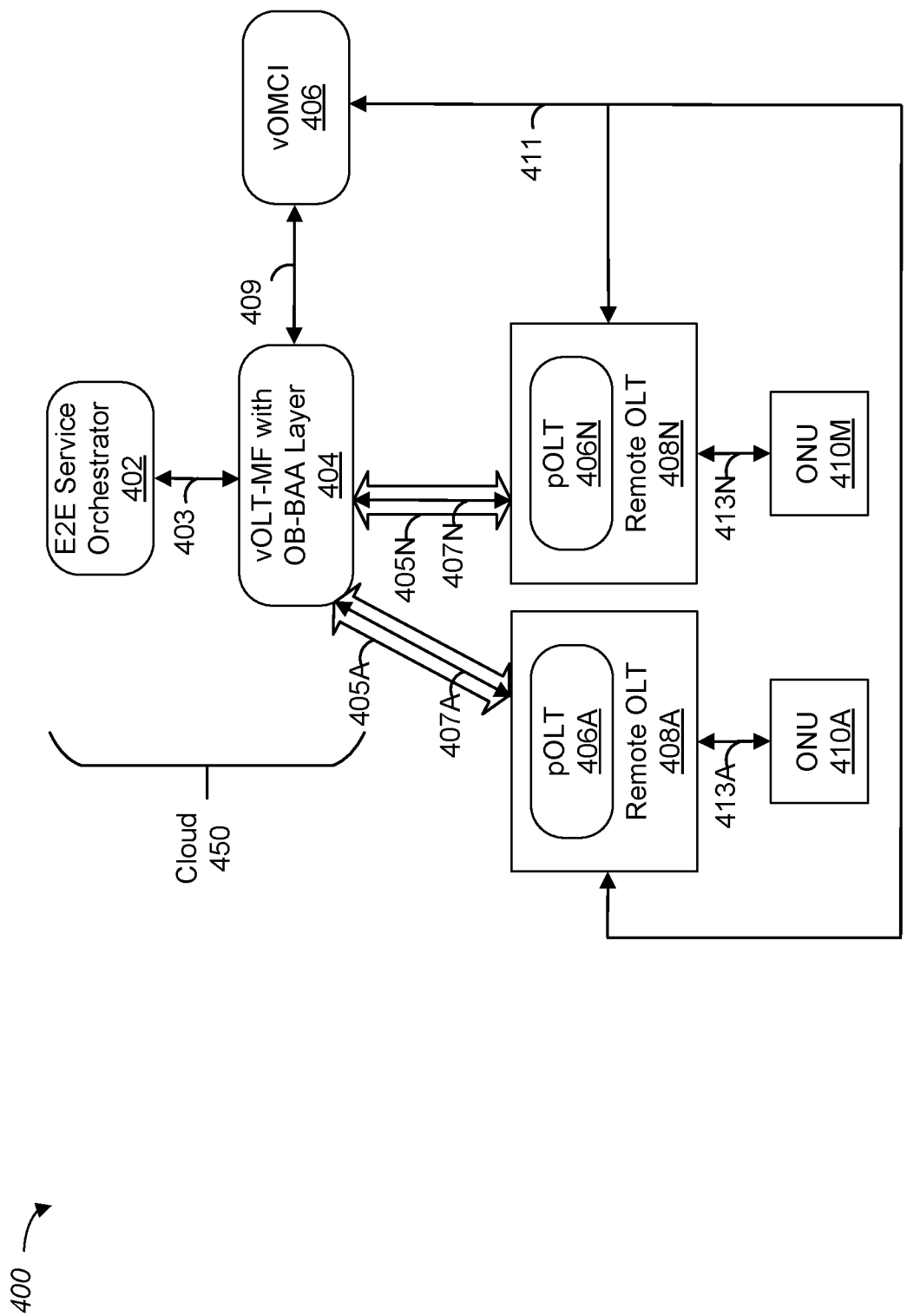
FIG. 4 is an example access network environment, according to one or more aspects of the present disclosure.

FIG. 4 is an example access network environment 400, according to one or more aspects of the present disclosure. The access network environment 400 can be similar to the access network environment of FIG. 1. The access network 400 can comprise an end-to-end (E2E) service orchestrator 402 connected to a virtual optical line terminal-management function (vOLT-MF) with open broadband-broadband access abstraction (OB-BAA) layer 404. The vOLT-MF with OB-BAA lay 404 can be connected to a virtual optical network unit (ONU) management control interface (vOMCI) 406 via a connection 409, and one or more remote nodes, such as a remote optical line termination (OLT) 408A via a connection 405A, and a remote OLT 408N (where N represents any number of remote OLTs 408) via a connection 405N (where N represents any number of connections 405). The E2E service orchestrator 402, the vOLT-MF 404, the vOMCI 406, and the remote OLTs 408 can be part of a network architecture (a passive optical network (PON) or a gigabit passive optical network domain (GPON)) provided by a service provider. The one or more remote OLTs 408 are distributed across a network environment 400.

Each ONU 410, such as ONU 410A and ONU 410M, can be disposed or positioned at any one or more locations, for example, any of a user's home, a customer premises location, an office location, any other location, or any combination thereof. An ONU 410A can connect to the remote OLT 408A via a connection 413A and an ONU 410M (where M represents any number of ONUs 410) can connect to the remote OLT 408N via a connection 413N. While FIG. 4 only illustrates a single ONU 410 connected to a remote OLT 408, the present disclosure contemplates that any one or more ONUs 410 can connect to any one or more remote OLTs 408. The vOMCI 406 can connect via a connection 411 to a remote OLT 408, for example, remote OLT 408A, remote OLT 408N. The remote OLT 408 can comprise a physical layer OLT (pOLT) 406, for example, remote OLT 408A and remote OLT 408N can comprise a pOLT 406A and pOLT 406N, respectively. As an example, if a new ONU 410 comes onboard, the ONU 410 will need to be provisioned by a pOLT 406 of a connected remote OLT 408 so that the ONU 410 can receive any one or more services provided by the cloud 450. To provision the ONU 410 for a certain service, the pOLT 406 sends or communicates information associated with the ONU 410 to the vOLT-MF 404 for communication to the E2E service orchestrator 402. The vOLT-MF can communicate the required configuration or provisioning information via a connection 409 to the vOMCI 406. The vOMCI 406 can communicate with the pOLT 406 the required configuration or provisioning information for the associated ONU 410. The pOLT 406 can convert the configuration or provisioning information (or generally any messaging from the vOLT-MF with OB-BAA layer 404) to a format required by the ONU 408 and send the converted configuration or provisioning information to the ONU 410.

When an ONU 410 comes onboard and/or disconnects from the remote OLT 408, an access network event can be detected by a remote OLT 408. For example, the remote OLT 408A and/or the remote OLT 408N can detect an access event associated with the ONU 410A and/or ONU 410M, respectively. The remote OLT 408A and/or the remote OLT 408N can send a report 407A and/or a report 407M, respectively, to a PON and/or GPON device controller via the vOLT-MF 404 over, for example, a network configuration protocol (NETCONF)/YANG interface. An event storm can occur when a plurality of remote OLTs 408 detect an access network event. For example, an area wide power outage can cause a plurality of ONUs 410 to simultaneously or substantially simultaneously disconnect and then reconnect with each disconnection and subsequent reconnection creating an access network event that is detected by the remote OLT 408. The remote OLT device 408 can be configured to initiate an event reporting delay based on an event delay policy associated with the remote OLT 408. The remote OLT 408 sends a report 407 generated based on the access network event associated with one or more ONUs 410 to the principal controller (the cloud 450) based on the event reporting delay. In this way, an event storm due to the connection and/or disconnection of a plurality of ONUs 410 can be thwarted or mitigated so that the network environment 400 is not adversely affected.

Figure 5:
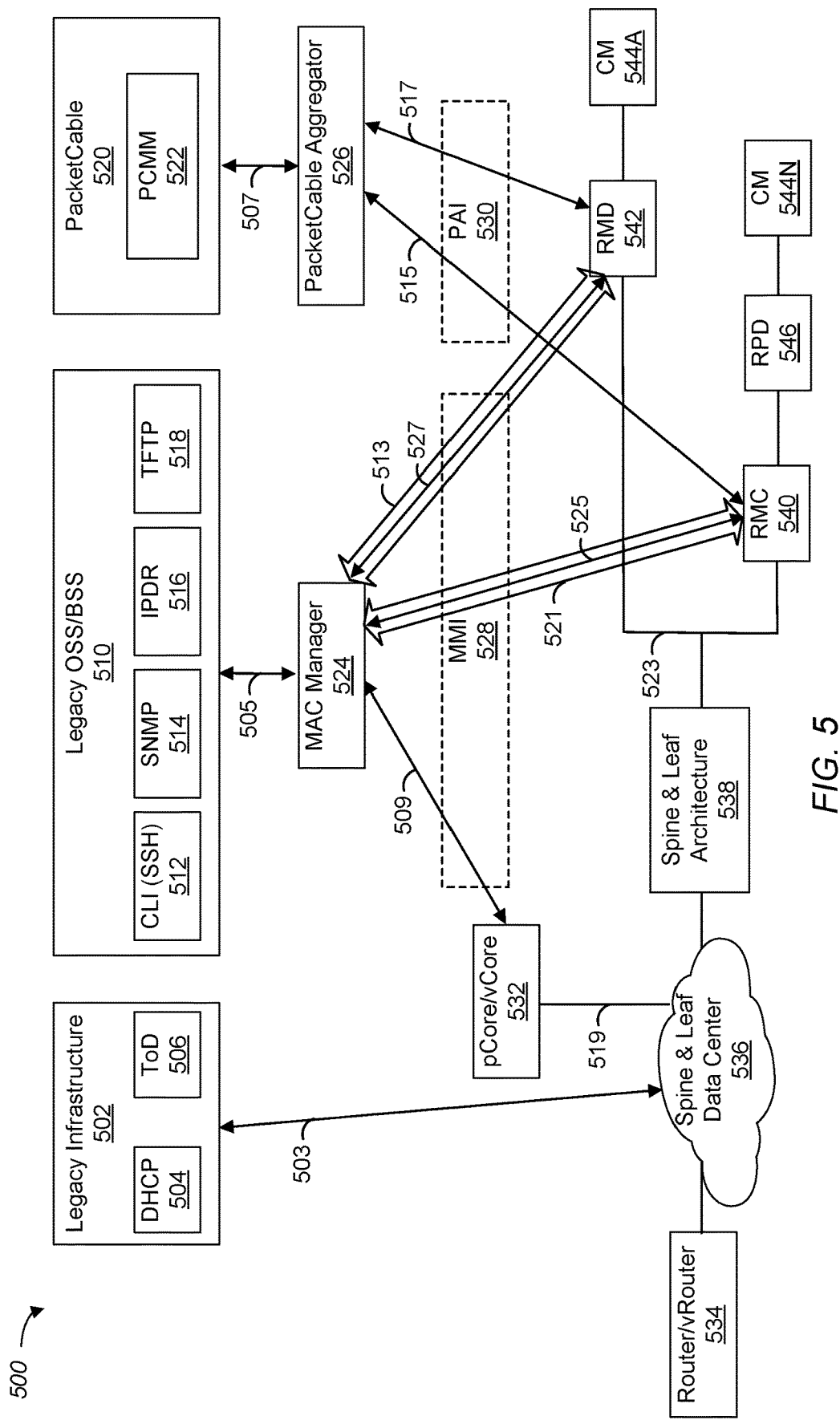
FIG. 5 is an example access network environment, according to one or more aspects of the present disclosure.

FIG. 5 is an example access network environment 500, according to one or more aspects of the present disclosure. The access network environment 500 can be similar to the access network environment of FIG. 1. The access network environment 500 can comprise a legacy infrastructure 502, a legacy operations support system/business support system (OSS/BSS) 510, a PacketCable gate 520, a MAC manager 524, a PacketCable aggregator 526, a principal core (pCore)/virtual core (vCore) 532, a modem management interface (MMI) 528, PacketCable Aggregator Interface (PAI) 530, a router/virtual router (vrouter) 534, a spine and leaf data center 536, a spine and leaf architecture 538, one or more remote MAC PHY devices (RMD) 542, one or more cable modems (CM) 544 (for example, cable modem 544A and cable modem 544N), a remote MAC core (RMC) device 540, and a remote PHY device (RPD) 546.

The legacy infrastructure 502 can comprise a dynamic host connection protocol (504) and a time of day (ToD) service 506. The legacy infrastructure 502 is connected to the spine and leaf data center 536 via a connection 503.

The legacy OSS/BSS 510 can comprise a command line interface (CLI) over secure shell (SSH) 512, a simple network management protocol (SNMP) 514, an Internet protocol detail record (IPDR) 516, and a trivial file transfer protocol 518. The legacy OSS/BSS is connected to the MAC manager 524 via a connection 505.

The PacketCable system 520 can comprise a PacketCable multi-media (PCMM) 522 gate. The PacketCable system 520 connects to the PacketCable aggregator 526 via a connection 507.

One or more devices can connect to the MAC manager 524 through an MMI 528, for example, pCore/vCore 532 via a connection 509, and one or more remote nodes, such as RMC 540, and RMD 542, via connections 521 and 513, respectively. The RMC 540 and RMD 542 can also connect through a PAI 530 to a PacketCable Aggregator 526 via connections 515 and 517 respectively. The RMC 540 can further be connected to an RPD 546 which can be connected to a CM 544N. The RMD 542 can also be connected to a CM 544A. While FIG. 5 only illustrates a single RMC 540 with RPD 546, and RMD 542 with a single cable modem 544A and cable modem 544N, respectively, the present disclosure contemplates that any number of RMCs 540/RPDs 546 and RMDs 542 can be connected to any number of cable modems 544.

The router/vrouter 534 can be connected to a spine and leaf data center 536 which is connected to a spine and leaf architecture 538 and finally to either or both of an RMD 542 and an RMC 540 all via a connection 523.

A plurality of cable modems 544 can be disposed or positioned at a plurality of locations, such as any of a user's home, a customer premises location, an office location, any other location, or any combination thereof. A plurality of cable modems 544, such as cable modem 544A and cable modem 544N, can register or connect (for example, come online) or de-register or disconnect (for example, go offline) at simultaneously or substantially simultaneously. For example, an area wide power outage can cause a plurality of cable modems 544 to simultaneously or substantially simultaneously de-register or disconnect, register or connect, or both. The RMC 540 can detect a registration or de-registration of the cable modem 544N as an access network event and can generate a report 525 that is sent to the MAC manager 524 and/or the RMD 542 can detect an access network event associated with a cable modem 544, for example, a registration or a de-registration of the cable modem 544A, and can generate a report 527 that is sent to the MAC manager 524. The RMC 540 and/or the RMD 542 can be configured to initiate an event reporting delay based on an event delay policy associated with each RMC/RMD. To avoid an event storm, the RMC 540 and/or the RMD 542 can send associated report 525 and 527, respectively, to the MAC manager 524 (a principal controller) based on the event reporting delay. In this way, an event storm due to the de-registration/disconnection and/or registration/connection of any of a plurality of RMCs 540, a plurality of RMDs 542, or any combination can be thwarted or mitigated so that the network environment 500 is not adversely affected.

FIG. 6 is an exemplary event delay policy 236, according to one or more aspects of the present disclosure. The event delay policy 236 can be stored in any of a memory 220, a data storage unit 230, a network resource that, for example, comprises a memory 220 or a data storage unit 230, any other storage medium, or any combination thereof. The event delay policy 236 can comprise one or more event delay policy parameters, such as any of an event reporting delay 602, a principal controller ID 604, a remote node ID 606, an access network event 608, a delay factor 610, any one or more network device identifiers, for example, an identifier associated with an auxiliary core 120, or any combination thereof.

The event reporting delay 602 can comprise any of a time range, a time interval, a time threshold, any other amount of time, time indicator, or time delay, or any combination thereof. The event reporting delay 602 can indicate the amount of time that any one or more remote nodes, such as an RMD 542 and/or a RPD 546, should delay or wait before sending a report associated with an access network event.

The principal controller ID can indicate an identifier associated with a principal controller, such as a principal core 126. The principal controller ID can be a unique identifier that uniquely identifies the principal controller. The auxiliary core ID 606 can be associated with a remote node, such as a unique identifier that corresponds to any of a remote node 102, an RMD 542, an RPD 546, any other remote node, or any combination thereof. An access network event 608 can identify or otherwise correspond to any type of access network event 608 that is associated with an event delay policy 236 for a principal controller ID 604.

The delay factor 610 can comprise one or more factors capable of implementing respective delays that temporally disperse the reporting of events that occur substantially simultaneously, and may be for example, a delay produced by any of a random number generator, a type of access network event, a threshold associated with a number of occurrences of a type of access network event, an event storage capacity of the remote node, any other factor, or any combination thereof. In one or more embodiments, the delay factor 610 can be used alone or as part of an algorithm to generate or determine the event reporting delay 602. The event reporting delay 602 can be determined based on a random number generator (so as to generate a random time for the delay) as identified by the delay factor 610 such that the event reporting delay 602 can be different for any given sending of a report to a principal controller. The delay factor 610 can indicate that a certain delay or weight is to be used for a given type of access network. The delay factor 610 can indicate that the threshold associated with a number of occurrences of a type of access network event should be used as a weight or that once the threshold is reached or exceeded an event report delay 602 should be used. The delay factor 610 can be indicative of the event storage capacity of a remote node such that the event reporting delay 602 is based on the event storage capacity of the remote node, for example, an event pending queue.

Figure 7:
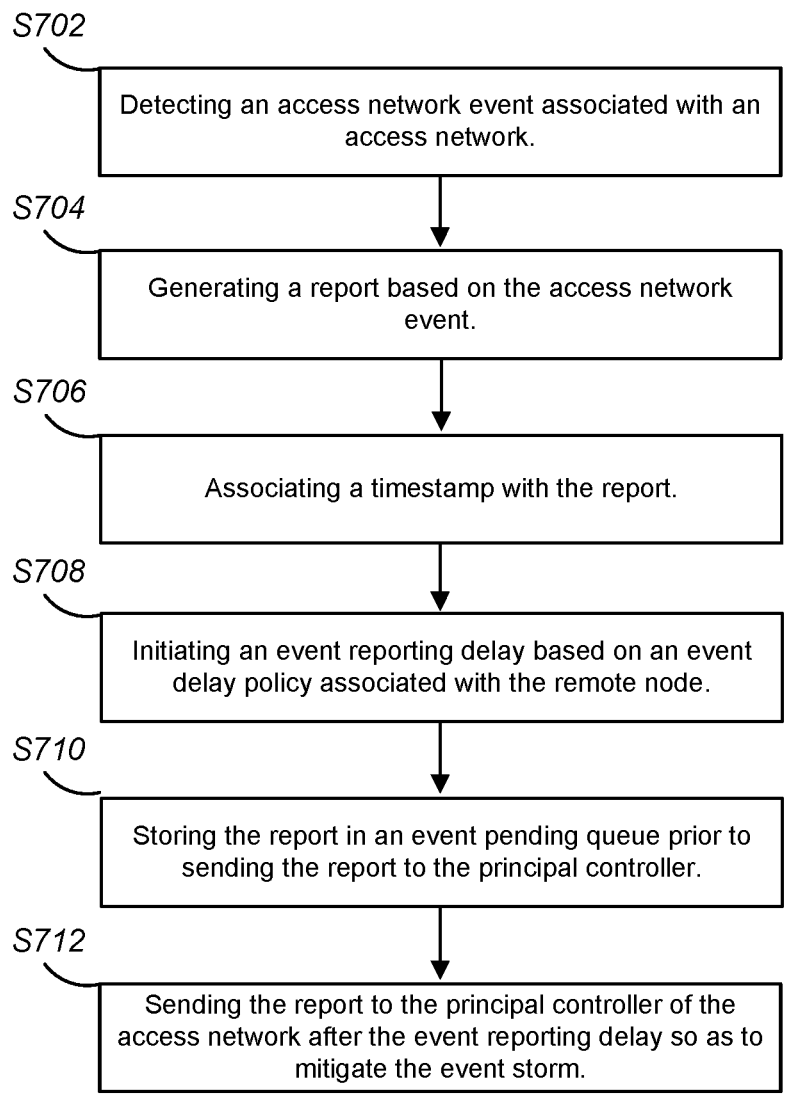
FIG. 7 is a flowchart for a method of a remote node to mitigate an event storm at a principal core of an access network, according to one or more aspects of the present disclosure.

FIG. 7 is a flowchart for a method of a remote node, or a plurality of remote nodes, connected to a principal controller of an access network to mitigate an event storm at the principal controller, according to one or more aspects of the present disclosure. In FIG. 7, it is assumed that any one or more devices include their respective controllers and/or processors and their respective software (such as one or more computer-readable instructions) stored in their respective memories, as discussed above in reference to FIGS. 1-6, which when executed by their respective controllers perform one or more functions or operations in accordance with the example embodiments of the present disclosure.

The processor 210 executes one or more computer-readable instructions, stored in a memory, for example, a memory 220 of a remote node, that when executed by the processor 210 perform one or more of the operations of steps S702-S712. In one or more embodiments, the one or more computer-readable instructions may be one or more software applications. While the steps S702-S712 are presented in a certain order, the present disclosure contemplates that any one or more steps can be performed simultaneously, substantially simultaneously, repeatedly, in any order or not at all (omitted).

At step S702, the remote node detects an access network event associated with an access network. In one or more embodiments, the remote node comprises an RPD, an RMD, or both, the principal controller is a principal core, and the access network event is associated with an auxiliary core connected to the remote node or a precision time protocol (PTP) synchronization. In one or more embodiments, the remote node is an RMD, an RMC device, or both, and the access network event is associated with a registration or de-registration of a cable modem connected to the RMD, the RMC device, or both. For example, the remote node can detect an ONU deregistration in absence of a periodic ranging message from a cable modem or an initial ranging request from the cable modem that starts registration process for the cable modem.

At step S704, the remote node generates a report based on the access network event. The report can comprise information associated with any of the access network event, the remote node, the network, any other information, or any combination thereof. For example, at step S706, the remote node can associate a timestamp with the report. The timestamp can identify or indicate the date, the time, or both that the access network event occurred.

At step S708, the remote node initiates an event reporting delay based on an event delay policy associated with the remote node. For example, the remote node can determine that the access network event is a type of event that can cause an event storm, such as by comparing the type of event to one or more parameters of the event delay policy, such as to one or more access network events associated with one or more event delay policies. Based on this determination, the remote node can initiate the event reporting delay. In one or more embodiments, the event reporting delay can be generated by the remote node based on one or more event delay policy parameters as discussed with reference to FIG. 6. In one or more embodiments, the event delay policy comprises a delay factor, wherein the delay factor is based on any of a random number generator, a type of access network event, a threshold associated with a number of occurrences of the type of access network event, an event storage capacity of the remote node, any combination thereof.

At step S710, the remote node stores the report in an event pending queue prior to sending the report to the principal controller. In one or more embodiments, the remote node can store the report in a local log with an associated timestamp. The reports in the local log can be transitioned to an event pending queue for sending to the principal controller. The event pending queue, the local log or both can have an associated storage size. In one or more embodiments, the remote node can determine that the event pending queue, the local log or both are at or above a threshold such that the event pending queue, the local log, or both cannot store additional report. Based on this determination, the remote node can proceed with sending one or more reports so as not to lose any reports associated with an access network event even if the event reporting delay has not expired.

At step S712, the remote node sends the report to the principal controller of the access network after the event reporting delay so as to mitigate the event storm. In one or more embodiments, the remote node sends the report from an event reporting queue, a local log, or both. As each remote node or group of remote nodes is associated with a different event reporting delay, the principal controller does not receive a plurality of report at the same or substantially the same time. In this way, an event storm is mitigated. Mitigation of an event storm can comprise reducing or removing any adverse effect due to the principal controller receiving too many reports within a short timeframe, such as within a timeframe that the principal controller cannot handle the reports without creating an impact to one or more network resources or operations.

By implementing the processes discussed herein, one or more resources, such as network resources, can be conserved and quality of service improved as an event storm at a principal controller is mitigated.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication or access network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method for a remote node, of a plurality of remote nodes, connected to a principal controller of an access network, the method comprising:
   detecting an access network event associated with the access network;
   generating a report based on the access network event;
   initiating an event reporting delay based on an event delay policy associated with the remote node; and
   sending the report to the principal controller of the access network after the event reporting delay.

2. The method of claim 1, wherein the remote node comprises a remote physical layer (PHY) device (RPD), a remote PHY media access control (MACPHY) device (RMD), or both, and wherein the principal controller is a principal core, and wherein the access network event is associated with an auxiliary core connected to the remote node or a precision time protocol (PTP) synchronization.

3. The method of claim 1, wherein the remote node is a remote media access control physical layer (MACPHY) device (RMD), a remote media access control core (RMC) device, or both, and wherein the access network event is associated with a registration or de-registration of a cable modem connected to the RMD, the RMC device, or both.

4. The method of claim 1, wherein the principal controller is a principal core, and wherein the access network event is associated with a loss of connection between the remote node and an auxiliary core of the access network.

5. The method of claim 1, further comprising storing the report in an event pending queue prior to sending the report to the principal controller.

6. The method of claim 1, further comprising associating a timestamp with the report and storing the report and the timestamp in a local log of the remote node, wherein the timestamp indicates a time of occurrence of the access network event.

7. The method of claim 1, wherein the delay policy comprises a delay factor based on any of a random number generator, a type of access network event, a threshold associated with a number of occurrences of the type of access network event, an event storage capacity of the remote node, any combination thereof.

8. A remote node, of a plurality of remote nodes, connected to a principal controller of an access network, the remote node comprising a memory and a processor, the processor configured to:
  detect an access network event associated with the access network;
  generate a report based on the access network event;
  initiate an event reporting delay based on an event delay policy associated with the remote node; and
  send the report to the principal controller of the access network after the event reporting delay.

9. The remote node of claim 8, wherein the remote node comprises a remote physical layer (PHY) device (RPD), a remote PHY media access control (MACPHY) device (RMD), or both, and wherein the principal controller is a principal core, and wherein the access network event is associated with an auxiliary core connected to the remote node or a precision time protocol (PTP) synchronization.

10. The remote node of claim 8, wherein the remote node is a remote media access control physical layer (MACPHY) device (RMD), a remote media access control core (RMC) device, or both, and wherein the access network event is associated with a registration or de-registration of a cable modem connected to the RMD, the RMC device, or both.

11. The remote node of claim 8, wherein the principal controller is a principal core, and wherein the access network event is associated with a loss of connection between the remote node and an auxiliary core of the access network.

12. The remote node of claim 8, wherein the processor is further configured to store the report in an event pending queue prior to sending the report to the principal controller.

13. The remote node of claim 8, wherein initiating the delay comprises associating a timestamp with the report and storing the report and the timestamp in a local log, wherein the timestamp indicates a time of occurrence of the access network event.

14. The remote node of claim 8, wherein the delay policy comprises a delay factor based on any of a random number generator, a type of access network event, a threshold associated with a number of occurrences of the type of access network event, an event storage capacity of the remote node, any combination thereof.

15. A remote device in a distributed access architecture configured to delay reporting to a principal controller of an event of a type associated with event storms, the amount of the delay based on a delay policy stored by the remote device.

16. The remote device of claim 15 comprising a remote media access control physical layer (MACPHY) device (RMD), a remote media access control core (RMC) device, or both, and where the event is of a type associated with a registration or de-registration of a cable modem connected to the RMD, the RMC device, or both.

17. The remote device of claim 15, wherein the principal controller is a principal core, and wherein the event is associated with a loss of connection between the remote node and an auxiliary core of the access network or a precision time protocol (PTP) synchronization.

18. The remote device of claim 15 configured to store the report in an event pending queue prior to sending the report to the principal controller.

19. The remote device of claim 15 where the delay policy is configured to temporally disperse the reporting of events to the principal controller that occur substantially at the same time.

20. The remote device of claim 19, wherein the delay policy comprises a delay factor, wherein the delay factor is based on any of a random number generator, a type of access network event, a threshold associated with a number of occurrences of the type of access network event, an event storage capacity of the remote node, any combination thereof.

* * * * *